(12) United States Patent
Czezatke et al.

(10) Patent No.: US 8,443,166 B2
(45) Date of Patent: May 14, 2013

(54) METHOD FOR TRACKING CHANGES IN VIRTUAL DISKS

(75) Inventors: Christian Czezatke, San Francisco, CA (US); Krishna Yadappanavar, Sunnyvale, CA (US); Andrew Tucker, Portola Valley, CA (US)

(73) Assignee: VMware, Inc., Palo Alto, CA (US)

( * ) Notice: Subject to any disclaimer, the term of this patent is extended or adjusted under 35 U.S.C. 154(b) by 905 days.

(21) Appl. No.: 12/489,755

(22) Filed: Jun. 23, 2009

(65) Prior Publication Data

US 2010/0228913 A1    Sep. 9, 2010

Related U.S. Application Data

(60) Provisional application No. 61/158,097, filed on Mar. 6, 2009.

(51) Int. Cl.
*G06F 12/00* (2006.01)
(52) U.S. Cl.
USPC .......................................... 711/203; 711/204
(58) Field of Classification Search .................. 711/203
See application file for complete search history.

(56) References Cited

U.S. PATENT DOCUMENTS

| | | | |
|---|---|---|---|
| 7,395,378 B1* | 7/2008 | Pendharkar et al. | 711/144 |
| 7,519,769 B1* | 4/2009 | Kulkarni et al. | 711/114 |
| 7,707,372 B1* | 4/2010 | Kumar et al. | 711/162 |
| 2007/0094466 A1* | 4/2007 | Sharma et al. | 711/162 |
| 2010/0106691 A1* | 4/2010 | Preslan et al. | 707/674 |
| 2011/0082972 A1* | 4/2011 | Cherkasova et al. | 711/111 |

* cited by examiner

*Primary Examiner* — Tuan Thai
*Assistant Examiner* — Ngoc Dinh

(57) ABSTRACT

Systems and methods for tracking changes and performing backups to a storage device are provided. For virtual disks of a virtual machine, changes are tracked from outside the virtual machine in the kernel of a virtualization layer. The changes can be tracked in a lightweight fashion with a bitmap, with a finer granularity stored and tracked at intermittent intervals in persistent storage. Multiple backup applications can be allowed to accurately and efficiently backup a storage device. Each backup application can determine which block of the storage device has been updated since the last backup of a respective application. This change log is efficiently stored as a counter value for each block, where the counter is incremented when a backup is performed. The change log can be maintained with little impact on I/O by using a coarse bitmap to update the finer grained change log.

23 Claims, 6 Drawing Sheets

METHOD FOR TRACKING CHANGES IN VIRTUAL DISKS

This application claims the benefit of U.S. Provisional Application No. 61/158,097, filed Mar. 6, 2009.

BACKGROUND OF THE INVENTION

Traditional backup software uses a driver that tracks changes made to a persistent storage device, also called a hard disk herein. The changes are used to backup only the parts of the disk that have changed since the last backup. However, such drivers require specialized code for each operating system. Also, implementation of the drivers is complex to ensure that not a single change is missed—this is particularly hard during a boot process.

Additionally, present backup methods do not handle complex situations in an efficient manner. For example, some existing backup routines use an archive bit where one bit is designated to a file, and the bit is turned on when data in that file is changed. A backup just retrieves and replicates files that have the corresponding bit turned on. When the backup is completed, all the archive bits are cleared. A drawback is that a break down would occur (due to resetting of the bits) when an additional backup application uses this interface. Even worse, the problem would not be detected by the additional backup application. Also, the archive bit corresponds to an entire file, and thus if one part of a file is changed, then all of it is backed up.

Other existing backup methods use redo logs. Once a redo log is created, all changes to a disk are captured in the redo log. When a backup is to be performed, data stored in the redo log is used for the backup. A new redo log is then created and the prior one is committed into the base disk. However, this method is costly in terms of additional operations and additional disk space required, particularly if there is more than one application performing a backup. This costly overhead stems, for example, from the fact that redo logs also preserve the prior state of the disk.

Using timestamps also requires relatively heavy storage and/or processing. Also, if the backup is taken from an alternate location, such as a dedicated backup server, issues could arise if the clocks between a virtual machine whose data is being backed up and a backup server are not tightly synchronized: If the clock on the backup server is ahead of the clock in the virtual machine, backups might be incomplete.

Another backup method uses checksums. While this method can deliver incremental image level backups, its scalability is limited. For example, every time a backup is performed, the entire disk to be backed up has to be read by the backup application. Hence, the load on the data source is not reduced compared to performing a full backup every time. Also, reliable checksums (e.g. cryptographic hashes) can be computationally expensive to compute.

SUMMARY OF THE INVENTION

One or more embodiments use virtualization to make the process of backing up information (e.g. data stored on a disk) more portable and/or efficient. Changes are tracked from outside a virtual machine, for example, in a virtualization software layer between the virtual machine and underlying software and/or hardware. Tracking changes in the virtualization software layer can reduce the impact on I/O performance of virtual machines. In one aspect, I/O cost is reduced by tracking only certain change information in the virtualization software layer. Tracking overhead can further be decreased by allowing a certain number of false-positives (i.e. blocks flagged as changed even though they were not modified). Having no false negatives (missing an area that has changed) can also be ensured in a simplified novel way.

One or more embodiments also allow multiple backup applications to accurately and efficiently backup a storage device. An epoch counter is incremented each time a backup is performed, and potentially at other times as well, e.g. a poweron or poweroff event. A change log stores the epoch when each of the blocks was last changed. This change log may be updated from coarse tracking information each time a backup is to be performed. Each backup routine records the epoch when that routine last performed a backup. As the epoch counter value of the last change for each block is known, any backup routine can determine which blocks have changed since it last performed a backup. Only these blocks may need to be transferred. As used herein, the term "backup" also applies to instances where data from one storage location is to be mirrored or replicated at another storage location.

According to one exemplary embodiment, a method of tracking changes made to a virtual disk of a virtual machine running on a computer system is provided. A virtual disk contains a plurality of blocks whose data is stored on physical blocks of one or more physical disks of a storage subsystem. A request to write data to a first virtual block of the virtual disk is received. The virtualization software layer translates (maps) this write request to the first block into a write request to a storage subsystem that contains physical disks. The virtualization software layer then sends the second write command to the storage subsystem. When the storage subsystem completes the write request, it sends a write completion response back to the virtualization software layer. Based on the write completion response, tracking information is maintained with the virtualization software layer. The tracking information indicates whether each of the plurality of virtual blocks has been written to since an event (e.g. a last backup of the virtual disk).

According to another exemplary embodiment, a method of backing up data on a storage device is provided. A counter is incremented each time a backup of a plurality of blocks of a storage device is performed. A first value of the counter is tracked when a first backup routine performs a backup of the storage device, and a second value of the counter is tracked when a second backup routine performs a backup of the storage device. For each block of the storage device, the counter value of when data for a block was last changed is stored. A backup is then performed with the first backup routine by retrieving the data for each of the blocks that have a counter value higher than the first value for the last backup performed by the first backup routine.

According to another exemplary embodiment, discontinuities in change tracking information is tracked by providing a unique ID to each virtual disk. Whenever change tracking information for a virtual disk gets re-initialized (e.g. using a clean/dirty bit), a new unique ID is created for the disk. Users of the change tracking interface can detect discontinuities by detecting changes in the unique ID.

DETAILED DESCRIPTION

One or more embodiments use virtualization to make the process of backing up information (e.g. data stored on a disk) more portable and/or efficient. Changes are tracked from outside a virtual machine, for example, in a kernel or other process of a virtualization software layer. Tracking changes in the kernel can reduce the impact on I/O performance of virtual machines. Also, in one aspect, the I/O cost is reduced by tracking changes in the kernel at a fairly coarse granularity.

One or more embodiments allow multiple backup applications to accurately and efficiently backup a storage device. Each backup application can determine which block of the storage device has been updated since the last backup of a respective application. This change information may be stored as a counter value, where the counter is incremented (e.g. by the virtualization software layer) when a backup is performed.

One or more embodiments of the present invention are usable within a virtualization platform. Accordingly, an overview of virtualization is provided in Appendix A.

Tracking Changes to a Virtual Disk

Similar to a physical disk, a backup of a virtual disk may be desired. To perform the backup efficiently, it is advantageous to know what changes have occurred since the last time the virtual disk was backed up. For example, if a backup is taken on Monday night, and the next backup is being taken on Tuesday night, it should be possible to implement a mechanism that lets backup applications identify regions of a disk that were changed between the backup on Monday and the one on Tuesday. This change information can then be used as a basis for performing differential or incremental backups, and this change information can also be used in other circumstances as described below.

In one aspect, incremental backups occur when only changes relative to a last running of the backup routine (used to create the differential backups) are used. In another aspect, differential backups occur when changes relative to a last running of another backup routine (e.g. a previous full backup) are used.

Figure 2:
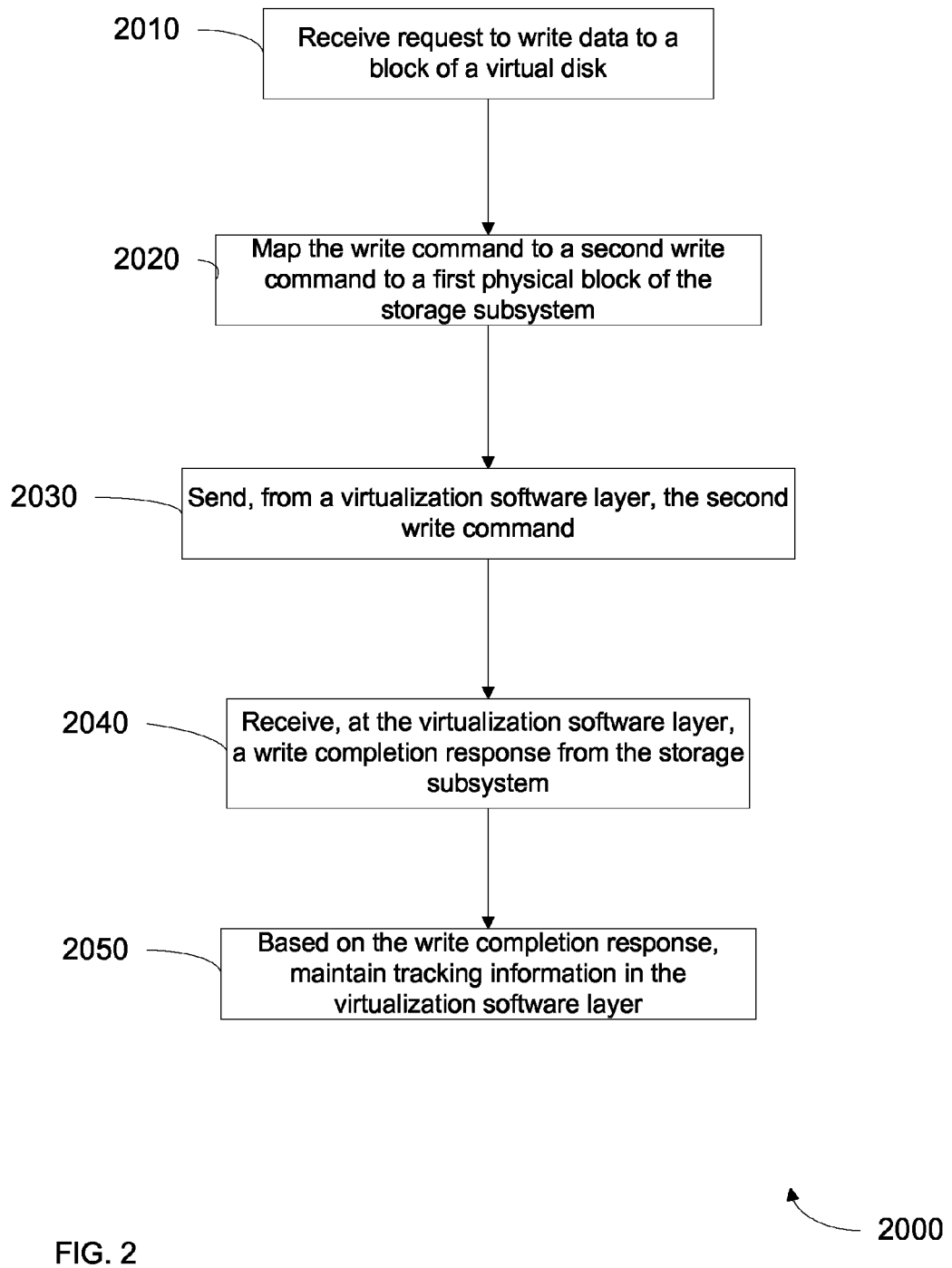
FIG. 2 is a flowchart illustrating a method of tracking changes made to a virtual disk of a virtual machine according to an embodiment of the present invention.

FIG. 2 is a flowchart illustrating method 2000 of tracking changes made to a virtual disk of a virtual machine according to an embodiment of the present invention. The virtual disk, e.g. VDISK 240, contains a plurality of virtual blocks as described in Appendix A. The data of the virtual blocks are stored on blocks of a storage subsystem. In one embodiment, the blocks of the storage subsystem are physical blocks of a block-based interface (e.g.: a hard disk or a logical unit number (LUN) on a storage area network (SAN) or internet small computer system interface (iSCSI) storage array). In another embodiment, the blocks of the storage subsystem are bytes of a file of a file-based interface (e.g.: a file system managed by an underlying operating system layer such as third extended filesystem (ext3) or NTFS or networked attached storage, such as a CIFS or NFS server). In one aspect, this storage subsystem exposing a file-based interface performs the mapping of the files to physical blocks.

In step 2010, a request to write data to a first virtual block of a plurality of virtual blocks of a virtual disk is received. In one embodiment, the request is received at VDISK 240 from guest OS 220. Guest OS 220 may create such a request when a file is written using, e.g., application 260. In another embodiment, VDISK 240 may receive the request from other guest software. In yet another embodiment, the request is sent from guest OS 220 and received by VMM 300 or kernel 600.

In step 2020, the write to the first virtual block is mapped to a write to a first block on a storage subsystem. The first block is, for example, a physical block of one or more disks or is a byte region within a file, which in turn is translated to one or more physical blocks by the storage subsystem.

In step 2030, a command to write the data to the first block on the storage subsystem is sent from the virtualization software layer (e.g. kernel 600) to the storage subsystem (e.g. to a physical disk that contains a first physical block). The kernel may be part of a host OS. In one embodiment, the kernel receives the write command (e.g. from VMM 300) and transmits the command to the physical disk. In one aspect, the kernel may keep track of the virtual block and the physical block associated with the write command.

In step 2040, the virtualization software layer receives a write completion response from the storage subsystem. The storage subsystem may perform the write operation in any number of ways as would be known to one skilled in the art, such as by a physical disk receiving the write command and modifying one or more sectors of data on the disk or by translating the write command to a file to one or more write commands to one or more blocks on one or more disks. In one aspect, the write completion response includes identification information as to what file or physical block of which physical disk the data was written. The response may also include a transaction number to identify which command corresponds to the response.

In step 2050, the write completion response is used to maintain tracking information in the virtualization software layer. The tracking information indicates whether each of the plurality of virtual blocks has been written to since an event. For example, the write completion response may be used to confirm that a particular block has been written to. In one embodiment, the tracking information is a bitmap with one bit for each virtual block and/or physical block. Such embodiments are discussed in more detail below.

In another embodiment, the tracking information is stored in a bloom filter. For example, if it is acceptable to potentially have some false positives (e.g. when a block is marked as changed when it has not actually changed), then a bloom filter may be used. The bloom filter offers an advantage of having an even smaller memory footprint than a bitmap (especially for large disks) at the expense of a small number of false-positives (i.e., blocks marked as changed that have not been changed). In order to reduce the number of false-positives, the boom filter can be reset at the end of an epoch or an epoch event can be generated once the bloom filter becomes too full.

As tracking is performed in the virtualization software layer, the tracking information may be obtained using the same instructions, regardless of the type of VM or guest software running, and thus, portability is increased. Also, there is a low (potentially near zero) impact on I/O performance of virtual machines by keeping the tracking information in the virtualization layer. In embodiments that have the tracking information stored as a bitmap, the bitmap is small enough to be kept in memory, and thus, there is minimal overhead. Another potential advantage is that a kernel (e.g. kernel 600) of the virtualization software layer may be up and running before a virtual disk is ever created, and thus every change to the virtual disk can easily be recorded. In one aspect, change tracking is independent of guest OS 220 running in the virtual machine, and issues regarding driver loads/unloads and writes happening before/after are avoided.

Figure 3:
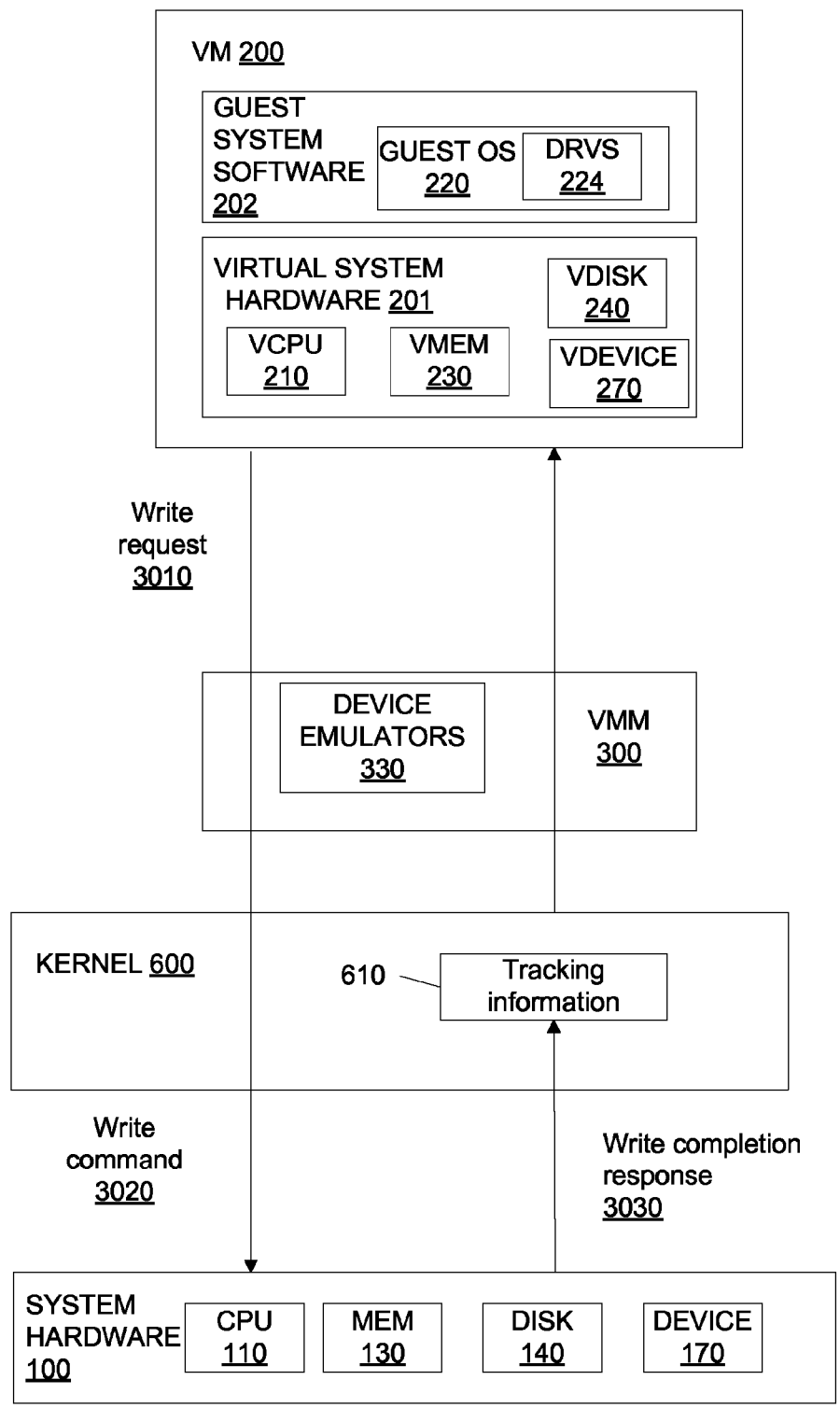
FIG. 3 shows a system diagram illustrating a method for tracking changes to a virtual disk according to an embodiment of the present invention.

FIG. 3 shows a system diagram illustrating a method for tracking changes to a virtual disk according to an embodiment of the present invention. Virtual machine 200 sends a write request 3010 to update a virtual block of VDISK 240. In one embodiment, write request 3010 is sent from guest system software 202. In one aspect, VDISK 240 in virtual system hardware 201 forwards the request onto the virtualization software layer. For example, a SCSI write can go from guest OS 202 to virtual system hardware 201. The write is then forwarded to VMM 300 which may then determine that an access to a file system in kernel 600 is needed. In another embodiment, write request 3010 is sent to VDISK 240, which directly forwards the request to kernel 600.

Write request 3010 may be directed to VMM 300. In one embodiment, VMM 300 may map the virtual block to a physical block. This mapping may be done via device emulators 330 that emulate VDISK 240. In this embodiment, VMM 300 may send to kernel 600 information as to the virtual block and the physical block that are involved in the write. This information may be in the form of, or encapsulated in, a command. In yet another embodiment, kernel 600 performs the mapping. For example, kernel 600 can receive the request (e.g. from VDISK 240) and determine a particular block in a particular file (stored on disk 140) to write to.

Write command 3020, including information as to which physical block is to be written, is sent to system hardware 100, specifically to DISK 140. In one embodiment, write command 3020 originates in VMM 300, kernel 600, or a kernel in a hosted OS (not shown). In another embodiment, write command 320 originates in kernel 600.

DISK 140 then performs the write operation and sends write completion response 3030 to the kernel 600. As writes are not instantaneous, a couple of millisecond may pass from when the write command is received and the response is sent. Write completion response 3030 may include information of the blocks and ID number for correlation of write command 3020 to write completion response 3030 by kernel 600.

Kernel 600 uses write completion response 3030 to maintain tracking information 610, e.g. a bitmap as to which virtual blocks have changed since an event (e.g. a last backup). For example, write completion response 3030 may contain information as to which virtual block was changed. In another example, write completion response 3030 contains information (e.g. the physical block written) that may be used to determine which virtual block was changed by correlating the physical block to the virtual block. In one embodiment, kernel 600 has a change tracking filter which creates tracking information 610 having a data structure with one instance for each virtual disk. Write completion response 3030 may also be sent back to VM 200.

As mentioned above, tracking information 610 may be a bitmap. In one embodiment, the bitmap (or any other tracking data structure) is implemented in a virtual SCSI (VSCSI) layer of kernel 600. Whenever a virtual machine obtains a VSCSI handle for a virtual disk, the corresponding change bitmap should be created and initialized to all zero. When the virtual machine releases the VSCSI handle, the corresponding change bitmap should be released. As explained below, before being released, the data from the change bitmap may be stored in a persistent storage device, e.g. in a change log.

In one embodiment, to retrieve tracking information 610 from kernel 600, a single extract call into kernel 600 may be used. Arguments of the single call may include any of the following: a handle, a pointer to a buffer, the size of the buffer, and a granularity size. The handle provides the virtual disk whose change bitmap is to be retrieved. The pointer is provided to a memory region (buffer) that will hold the change bitmap after a successful invocation of this call. A set bit in the change bitmap indicates that a change has happened in the corresponding area of the disk. The size of the buffer pointed to by buffer can cause the call to fail if the buffer is too small to hold the entire change information. A granularity provides the amount of data represented by each bit in the change bitmap. In one aspect, the granularity is configurable at runtime.

The extract call retrieves the current content of the change bitmap for a given handle. In one aspect, if the return value of the call indicates successful completion, the change bitmap is reset to all zero. In one embodiment, the implementation of this function could guarantee that no writes would be lost in the case of a write operation racing with an extract call. For example, an in flight write operation should either turn on the bit before the bitmap gets cleared (making the bit show up in the change bitmap that gets returned) or turn on the bit after the clear operation.

The extract call may be used by backup routines wishing to determine which blocks to use for an incremental backup. A problem can rise however when multiple applications perform a backup, or other replication of data. One embodiment uses an epoch counter to alleviate such issues, as is described below.

Lightweight Change Tracking Using an Epoch Counter

If two backup routines simply used a bitmap of which blocks have been changed and then reset the bitmap after a backup, then the two routines would interfere with each other. For example, in a setup where a remote replication uses this mechanism to track changes in two hour increments, daily incremental backups would break because the changed block bitmap gets reset by the remote replication every two hours.

Figure 4:
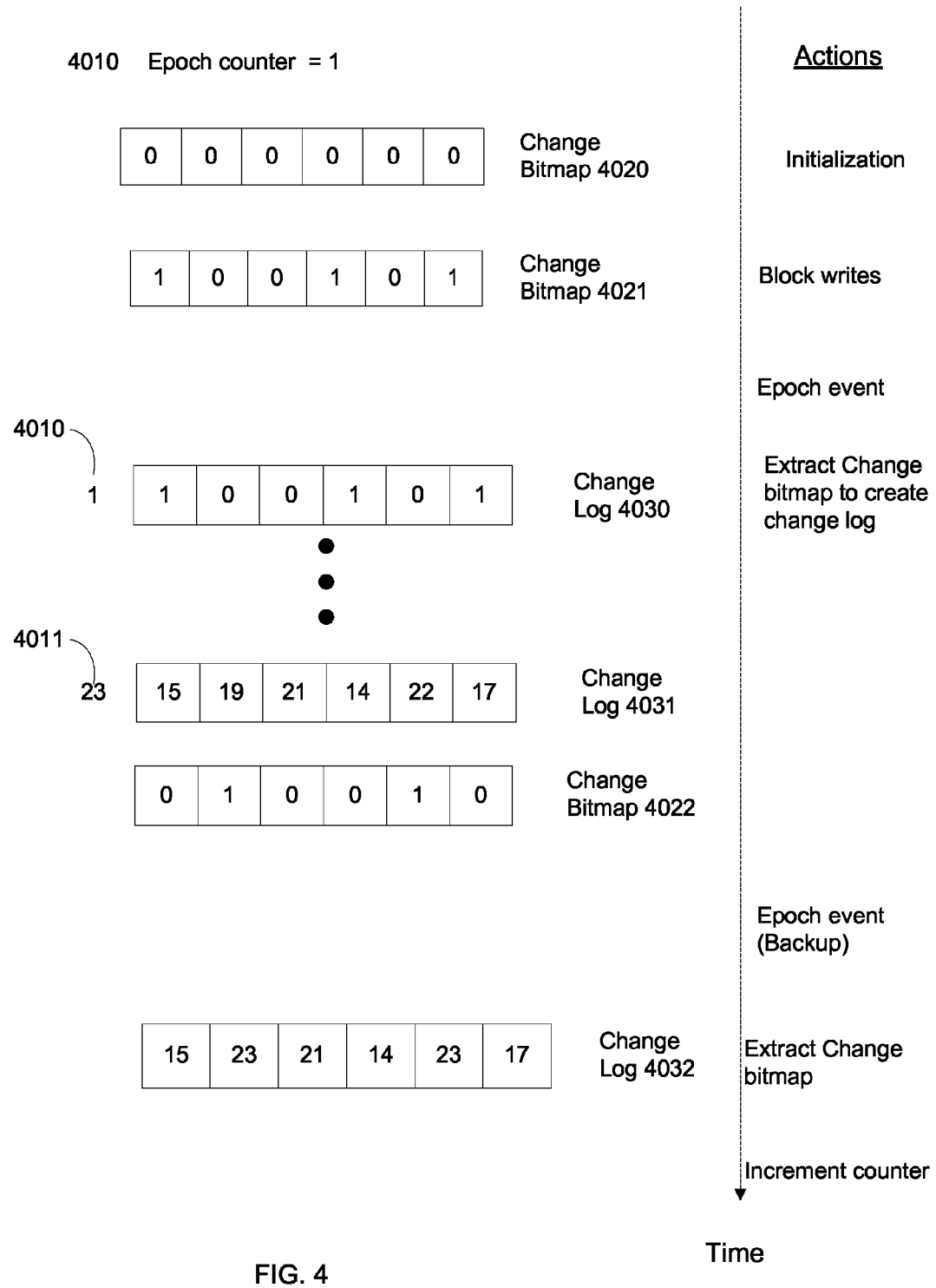
FIG. 4 shows data structures, including an epoch counter, used to provide efficient change tracking that allows multiple backup applications according to an embodiment of the present invention.

FIG. 4 shows data structures, including an epoch counter, used to provide efficient change tracking that allows multiple backup applications according to an embodiment of the present invention. This embodiment uses a counter and data structures to track which blocks of memory have been changed at particular values (epochs) of the counter. An epoch is a particular event in the past, for example, when a snapshot of a virtual machine and its disks is created or when a virtual machine is powered on or off. For example, an epoch can be a time period since a previous backup that was performed 24 hours ago. Other examples are mentioned herein.

The left part of FIG. 4 shows data structures stored in memory or a persistent storage device. For example, in one embodiment, change bitmap 4020 is stored in memory (which requires continuous power to maintain storage, and is thus not persistent) and change log 4030 is stored in a persistent storage device.

The right hand side labeled Actions denotes events that have occurred or are occurring when a data structure on the left has the values shown. The Actions are chronological as one moves down the page.

Initially, epoch counter 4010 is at some default value (e.g. 1 or 0) as being the first time period in which a change is tracked. For example, after a snapshot of a virtual disk is taken, it may be desired to turn change tracking on. Change bitmap 4020 for a particular virtual disk has its values set to zero for all of the blocks of the virtual disk. When a block is written, the bit for that block is changed from a "0" to a "1". This corresponds to one particular embodiment of method 2000. Change bitmap 4021 shows that blocks 1, 4, and 6 have been written.

When an epoch event occurs, change bitmap 4021 (in the state just before the epoch event is received) is used to update change log 4030. For example, an extract call may be used to obtain change bitmap 4021. Change log 4030 has an integer (e.g. a 32-bit integer) for each block. As change log 4030 can take up appreciable space, change log 4030 may be stored on a disk (i.e. a persistent storage device). Epoch counter 4010 may be stored in a header associated with change log 4030.

Each integer of change log 4030 identifies the last epoch in which a particular block was changed. Thus, when the epoch event (e.g. a request for a backup) occurs, the integers are updated based on change bitmap 4021. For example, each of the blocks that have a "1" have the corresponding integer changed to the current epoch number. The epoch counter may then be incremented. An epoch event is any event that causes the epoch counter to be incremented. Examples include a backup, a copy, a move operation on the virtual disk, and fault tolerant failover when a secondary virtual machine takes over for a primary virtual machine.

Change log 4030 can then be used to define what blocks have been changed in the last epoch. This change information may be useful in performing a backup. For example, change log 4031 shows the state during epoch 23. Change bitmap 4022 shows the blocks that were changed in the epoch 23.

A request for a backup is then received, which is an epoch event. Change bitmap 4022 is used to create change log 4032. Note how the integers for the 3rd and 5th block become "23" as that is the last epoch in which those integers were changed. The epoch counter can then be incremented. Note that since ticks on the epoch counter are triggered by certain events, they are typically not evenly spaced in (wall clock) time.

The backup routine can use change log 4032 to determine which blocks to transfer data to the backup file. In one embodiment, each block that has a more recent number than the last epoch in which that backup routine was performed has its data transferred. One skilled in the art will appreciate the different embodiments to achieve the same result, such as different default values, times when the epoch counter is incremented, and the operation (e.g. greater or equal) to be used to determine which blocks to transfer.

In one embodiment, a change log is maintained for each disk (that is part of the snapshot state) where we store a per-snapshot property, hence if there is a VM with 3 snapshots around, there will be one change log for each snapshot of each disk.

In another embodiment, since a change log corresponds to a particular base disk or snapshot thereof, such as a redo log, it may be important to detect cases where a virtual disk got manually deleted and recreated. To this end, embodiments have a unique ID (termed UUID below) of the corresponding base disk/redo log stored in the change log header as well. If a virtual disk is deleted and re-created, a new unique ID will be created for it which can be detected by the application using the change tracking information. If such a condition is detected, the application discards all information about change tracking that was previously acquired and starts anew.

Figure 5:
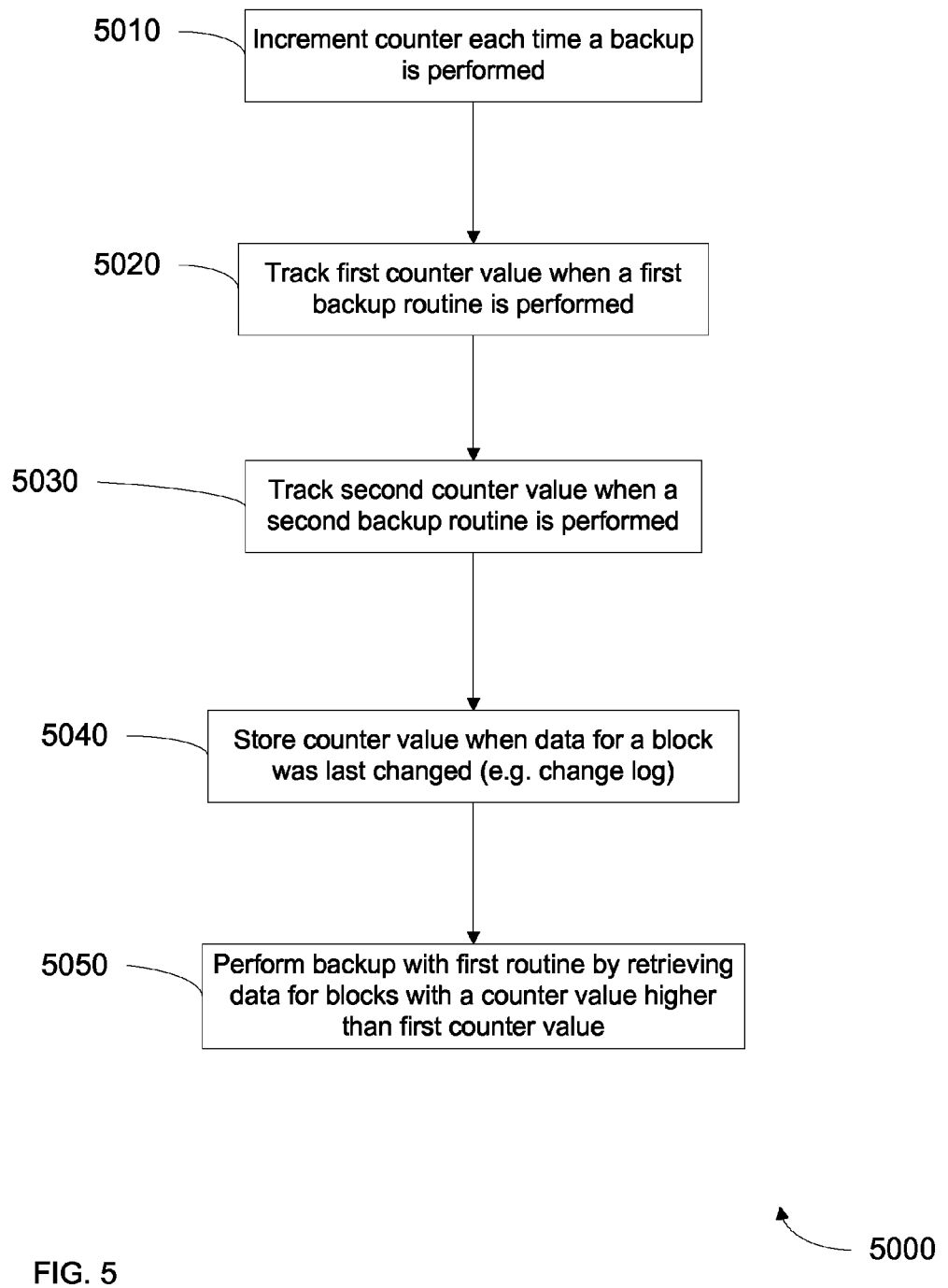
FIG. 5 is a flowchart of a method for performing multiple different backup operations in an efficient manner according to an embodiment of the present invention.

An example of how multiple back operations can interact is now provided. FIG. 5 is a flowchart of method 5000 for performing multiple different backup operations in an efficient manner according to an embodiment of the present invention. The backup operations may be of different time periods, e.g. every 2 hours and the other every 24 hours. The operations may also be involved with the copying of a VM from one computer system to another, as is discussed in more detail below.

In step 5010, a counter is incremented each time a backup of a plurality of blocks of a storage device is performed. For example, epoch counter 4010 is incremented each time a backup is performed. In one embodiment, the counter is incremented when other epoch events occur, for example, when a VM is moved. The storage device may be a physical storage device or a virtual storage device. In one aspect, the virtualization software layer handles the incrementing of the epoch counter 4010.

In step 5020, a first value of the counter is tracked when a first backup routine performs a backup of the storage device. For example, each time the first routine is performed, the counter value may be recorded. When the first backup routine is called again, the last time (i.e. epoch) a backup was performed by the first routine will be known. In one aspect, the first value changes each time the first backup routine is called.

In step 5030, a second value of the counter is tracked when a second backup routine performs a backup of the storage device. For example, similarly for the first backup routine, the value of the counter is recorded when a backup is performed by the second routine.

In step 5040, the counter value of when data for a block was last changed is stored for each block. For example, change log 4032 keeps track of the last epoch when each block was changed. Hence, all the writes occurring within the same Change Epoch would be tagged with the same change epoch number.

In step 5050, a backup is performed with the first backup routine. Data is retrieved for each of the blocks that have a counter value higher than the first value for the last backup performed by the first backup routine. In this manner, the first backup routine can identify each of the blocks that has changed since the last backup by the first backup routine. Thus, there is no interference with the second backup routine.

Additionally, in one embodiment, the amount of storage cost and time is kept minimal. For example, it is expensive to update an on-disk (persistent) change tracking information every time a write to a virtual disk is issued or completed. Instead, the change log when stored in physical disk (i.e. a persistent memory, such as a magnetic hard drive or an optical disk) is only updated when an epoch event occurs (e.g. when a backup is performed). The update of the change log (e.g. 4032) may be implemented via a change bitmap (e.g. 4022) kept in memory (e.g. cache or RAM). This minimizes the expense of updating this tracking information.

Accordingly, embodiments implement a hybrid bitmap/timestamp approach. The tracking of the change bitmap advantageously provides small memory and I/O requirements. While, the change log provides more tracking information in the persistent on-disk tracking data structure, but which requires less frequent updating. Since the change log is stored on persistent storage, tracking can be preserved across VM poweron/poweroff cycles as is required for backup applications.

Handling Discontinuities with a UUID

In a real-world implementation, there may be cases in which changes since a previous well known point in time cannot be computed, thus causing a discontinuity. Examples of such rare events are the loss of the persistent change tracking data stored on disk or a crash of the computer system (e.g. the host running a virtual machine).

In general, it is practically impossible to bring the change tracking data up to date after such a discontinuity has occurred. Therefore, embodiments re-initialize change tracking after a discontinuity. Additionally, embodiments detect when the change tracking information has been re-initialized. For example, if the backup application mentioned in the section above requests a list of blocks that have changed between $Epoch_1$ and $Epoch_2$, embodiments detect cases where the change tracking information had to be re-initialized some time between $Epoch_1$ and $Epoch_2$.

Figure 6:
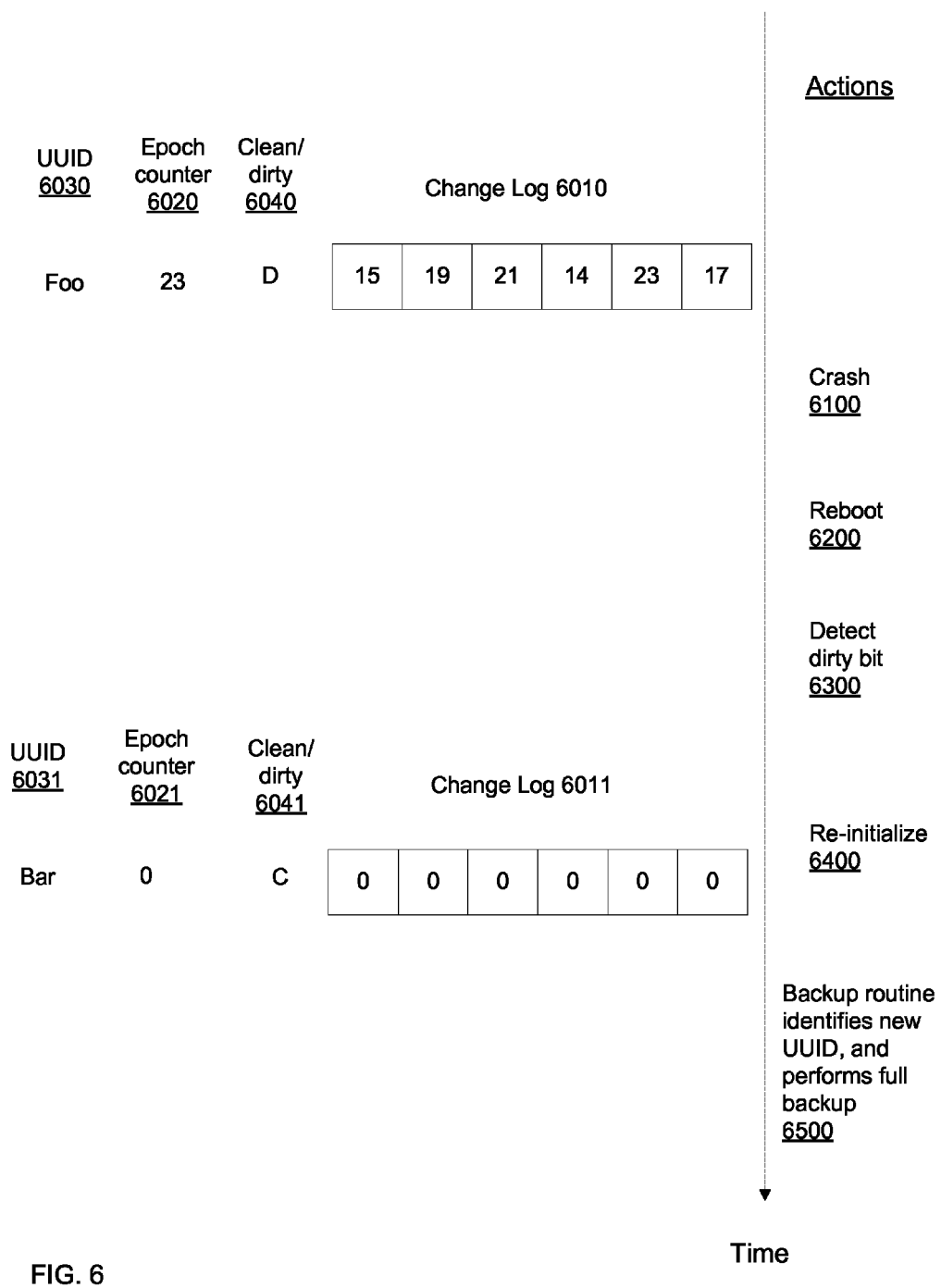
FIG. 6 illustrates a method for providing detection of discontinuities in change tracking information according to an embodiment of the present invention.

FIG. 6 illustrates a method for providing detection of discontinuities in change tracking information according to an embodiment of the present invention. The left part of FIG. 6 shows data structures stored in a persistent storage device. The right hand side labeled Actions denotes events that have occurred or are occurring when a data structure on the left has the values shown. The Actions are chronological as one moves down the page.

Change log 6010 shows values that provide an accurate depiction of changes that have occurred in the last 23 epochs. Epoch counter 6020 shows the epoch as currently being 23. An additional universally unique identifier (UUID) 6030 is also stored with the change tracking information. UUID 6030 is used to track discontinuities in change tracking information.

UUID is a binary stream that is globally unique, e.g. "Foo," which can be combined with the epoch number to create an ID of "foo007". Whenever change tracking information for a virtual disk gets re-initialized, a new UUID is created for this disk. Users of the change tracking interface retain both a value T for the epoch counter and the UUID for the last time that the user (e.g. backup application) replicated the data (e.g. performed a backup).

For example, the time of the initial full backup would be identified by the tuple $<UUID_1, T_1>$, and the time of the subsequent incremental backup would be identified by the tuple $<UUID_2, T_2>$. In one embodiment, the backup application queries for changes between T1 and T2. In this case, the request would return a list of changed blocks only if these UUIDs match: $UUID_1 = UUID_2$. If these values do not match, then a re-initialization has occurred between $T_1$ and $T_2$.

In one embodiment, the re-initialization is performed based on clean/dirty bit 6040. Clean/dirty bit 6040 is used to specify whether any outstanding writes might have occurred, e.g. writes for which an acknowledgment has not been received. One instance where the clean/dirty bit 6040 will be marked as dirty is when a virtual disk (or a snapshot thereof) is opened for write or when the first write to a virtual disk (or a snapshot thereof) happens after it was opened. Opening of a virtual disk includes opening data associated with the virtual disk, such as the change log for a virtual disk.

One instance that clean/dirty bit 6040 can be marked as clean is when a virtual disk (or a snapshot thereof) that was opened for write access is closed. On the other hand, when a virtual disk (or a snapshot thereof) is being opened and the clean/dirty bit is found to be set to clean, then the change tracking information stored in change log 6010 may be assumed as reliable. However, if a disk is opened and the bit is found to be dirty, then the change tracking information stored in change log 6010 is assumed to be unreliable. In one aspect, users should then assume that the entire content of the virtual disk has changed.

Referring back to FIG. 6, the actions associated with a method of re-initialization of tracking information after a discontinuity and detecting the discontinuity are described.

At action 6100, a crash or other discontinuity occurs. At action, 6200 the VM, computer system, storage device, or other entity that crashed is rebooted. Upon rebooting, clean/dirty bit 6040 is checked at action 6300. Since clean/dirty bit 6040 is marked as dirty, the tracking information is known to be inaccurate. For example, if a disk is opened and the header of the change tracking information is not marked as "clean," we know that the disk was shut down uncleanly and that change tracking information might have been lost. In this case, the change tracking information needs to be reset and a new change UUID is generated.

Accordingly, at action 6400, the change tracking information is re-initialized. Change log 6011 has the integers set to zero, one, or other offset depending on the specifics of the initialization algorithm. Epoch counter 6021 is set to zero or other offset. Clean/dirty bit 6041 is set to clean. Then, to mark the existence of a discontinuity, a new UUID 6031 is created. In this example, the UUID is changed from "Foo" to "Bar". Note that any set of characters or numerals may be used for the UUID as long as they are universally unique. RFC 4122 provides an example of one way to create such a unique ID.

At action 6500, a backup routine is called to perform a backup. The last time that the backup routine was performed is tracked, e.g. the UUID and epoch counter values for the last backup are stored. For example, assume that the time of the last backup was "Foo16". Thus, since the UUID "Bar" is different from "Foo," the discontinuity is discovered. The backup routine may then take another full backup reading of the entire disk as the change tracking information is not trusted.

In one embodiment, whenever a disk management routine is asked to open a virtual disk for read/write, the change tracking information for the disk will be marked as dirty until a close routine is called on this disk. So whenever an application manipulating disks with change tracking crashes, the change tracking information will remain marked as dirty and is hence considered invalid.

Some embodiments assure that no modification is made to a tracked disk that is not reflected in the change tracking information associated with it. Software that is not aware of change tracking is not allowed to open virtual disks with change tracking, since modifications to the disk could otherwise be made that are not reflected in the change tracking state.

In one embodiment, a disk has a version number for implementing this safeguard. Activating change tracking on a virtual disk bumps up the virtual disk's version number to the new version. Since this new version number is unknown to previous versions of the disk manager that do not support change tracking, these old versions will not be able to open virtual disks with change tracking.

In embodiments where change tracking information is associated with virtual disks, the implementation of this feature should be contained within the disk management application for the virtual disks. This will prevent modifications that are not reflected in the change tracking information associated with the virtual disk.

In one aspect, to support change tracking for the widest set of virtual disks possible, change tracking should not be tied to a particular disk format. Change tracking information may be stored in an auxiliary file alongside with the tracked virtual disk. The virtual disk's descriptor file can contain a pointer to this auxiliary file. If this change tracking file gets lost, it should still be possible to open the corresponding disk and change tracking should get re-initialized next time the disk is opened for write.

Tracking Changes While Performing Move (also use Redo Log)

The track changes information may also be used when a VM is moved from one computer system to another, which may constitute an epoch. For example, the other machine may have an old version of the VM, including the disk drive, and an incremental move is desired. This may be done, e.g., when a VM is moved to a notebook computer for use while traveling. When the user returns to the office, her/his virtual machine (including all changes s/he made to her/his data while offline) can be checked back in. Without the ability to track changes to virtual machine disks, every checkin/checkout operation needs to perform a full copy of the virtual machine, which is very inefficient and time consuming.

The VM may also be moved for other reasons. For example, the present computer system that a VM is running on may need to be taken down for service. Ideally, this movement should be as seamless as possible. To this end, all of the changes during the move are tracked, and control of the VM is then switched at the very end.

In one embodiment, change tracking can be used to record areas of a virtual disk that get changed while a copy operation is in progress. For example, this copy operation may be moving the virtual disk to a new location while the virtual machine using the disk is still running. A sequence of smaller and smaller sets of changes is obtained, until a low water mark or threshold (changes are small enough) is reached. At this time the VM is stunned, the final delta change is copied to the new location, and the VM is switched over to the new copy of the virtual disk. A VM can be shut down and moved during this last time period since the time is short enough that a user or other operations are not significantly disrupted.

In one embodiment, each pass through in copying data that has changed since the last pass is a new epoch. This use of change tracking is also called short-term tracking. For short-term tracking, change tracking information does not have to be stored on disk permanently and does not have to persist across VM poweron/poweroffs. In one aspect, short term trackers can query blocks that have changed since the last pass (session) was started. Each query increments the epoch counter.

Change tracking also may be used in resynchronization of disks for redundant VMs. A redundant (secondary) VM may be used to ensure no loss of data or service by a primary VM. Change tracking can be used to re-synchronize the disks of the secondary VM when the primary VM loses connection to the secondary one. If the loss of connectivity is long enough, it might become cheaper and/or easier to just re-synchronize the secondary VM's disk and memory state than to replay all the instructions that were missed. In this case, change tracking can be used to re-synchronize the secondary VM's disks once the connection between the primary and secondary VM is re-established.

For this purpose, in one embodiment, a new change tracking epoch should be started frequently (e.g. every couple of seconds). To re-synchronize disks, only the disk information from the latest completed epoch before the connectivity was lost up to the present state needs to be re-applied on the secondary VM.

Multiple Concurrent Users of Short-Term Tracking

In one embodiment, the change tracking architecture can support multiple short term tracking consumers concurrently, without each of them interfering with the other or with long term tracking (i.e. backups).

Multiple bitmaps can hold in-memory changes when multiple short-term tracking consumers are available. In general, if N short-term consumers are active, N+1 tracking bitmaps will be needed. The bitmaps form a stack, where each bitmap is associated with the change epoch number that its addition started. If a write occurs, the corresponding bit in the topmost bitmap (i.e., the one associated with the highest change epoch number) is set.

If no short-term tracker is active, a single change "base bitmap" is present, which is associated with $T_{Base}$, identifying the change epoch number that started after the last time change tracking information was committed to disk. If a short-term tracker A starts a new change session, the Change Epoch Counter is incremented and the bitmap is associated with the new Change Epoch Number $T_N$. If an additional short-term tracker B starts another session, a third bitmap is added and associated with the new Change EpochNumber $T_{N+1}$.

If A now requests a list of changed disk areas since it started its change session at $T_N$, the following operation is performed as an atomic exchange. A new Change Epoch, $T_{N+2}$ is started and a new bitmap is added for A that is associated with Change Epoch $T_{N+2}$. All the bits in A's previous change bitmap associated with $T_N$ are pushed in the next lower bitmap in the stack, which in this case would be the "base bitmap" associated with $T_{Base}$. A's bitmap for $T_N$ is removed.

As a result, the union of the content of A's $T_N$ bitmap and all other bitmaps currently in the stack that are associated with epochs newer than $T_N$ is returned.

As described above, to commit change information to stable on-disk storage, bitmap information is used to update the on-disk information that contains change epoch numbers for each block of a disk. The state of the on-disk change tracking structure is associated with a "latest commit epoch", identifying the latest change epoch that was ended by committing change information to disk. Since change epoch information can be committed to disk while short-term change tracking sessions are active, there is no risk of interference.

If more than one change tracking bitmap is present (because of users of the short-term tracking interface), the following algorithm is used to determine the appropriate epoch number for each changed disk area when information is committed.

For each chunk of tracked disk space, find the bitmap with the highest epoch counter in which the corresponding bit is set. If the corresponding bit is unset in all current bitmaps, leave the on disk change epoch unmodified. Else, update the on-disk Change Epoch Number for this chunk of disk data with the number of the Epoch Counter in the bitmap found in step 1.

Maintenance and Creation of Virtual Disks

Aspects of handling virtual disks in connection with change tracking capabilities are now discussed.

Disk Creation

In one embodiment, when creating a new virtual disk, it is possible to specify what policy is applied for handling change tracking information. However, it may not always be possible to have the policy actively specified. Therefore, a reasonable default policy is used if the corresponding option is not specified.

In one aspect, a new flag is added to a create parameter structure outlining what policy should be used when creating a virtual disk regarding change tracking information. The following settings may be available. In one embodiment, if a create operation is called, the change tracking may be turned off as a default. If a clone operation is called, the change tracking state of the source is used.

In another embodiment, when a virtual disk is deleted, a disk manager (e.g. DiskLib) assures that a disk deletion also results in the corresponding change tracking information being deleted as well. Hence, when the disk is re-created through a subsequent API call, no old change tracking information is left behind, even when the disk is re-created using the same name.

Snapshot Creation

There are also a series of API calls that deal with the creation of redo logs on top of existing disks, the operation of attaching a redo log to a base disk and with committing redo logs into base disks. These operations need to be made aware of change tracking.

Since each base disk/redo log has its own, independent copy of change tracking information, the following actions need to be taken when creating/attaching or removing redo logs. When a redo log is created, the redo log inherits the state of change tracking from its parent. When the parent is tracked, a copy of the on-disk change tracking information is created for the child and the child's descriptor should contain a pointer to this new copy.

When a redo log is attached to a pre-existing virtual disk, change tracking information for the parent and the child will not be modified, since higher layers of software already need to assure that the attach operation is legitimate.

When committing a redo log into a base disk (or another redo log), the following algorithm is used to determine modifications that need to be applied to the parent's change tracking information. If change tracking is enabled in the child, change tracking will also be enabled in the parent, and the parent's prior change tracking information (if it was present at all) will be replaced with a copy of the child's tracking info. This happens regardless of the change tracking state of the parent prior to the commit operation. Should the parent disk type not support change tracking (for example, non-VMware disk formats or old legacy disks) then change tracking remains off in the parent. If change tracking is enabled in the parent, but disabled in the child, it will be disabled in the parent as well.

Changing Size of Disk

In another aspect, the size of a virtual disk may be changed. If a virtual disk is resized, change tracking information associated with the disk must reflect the change in disk size. However, the newly added area of the virtual disk will not be marked as changed. It is up to the user of the (long term) change tracking interface to realize that the size of the virtual disk has changed. However, as writes happen to the newly extended disks, blocks will get marked as dirty. So when a disk got extended, blocks that are not marked as changed in the extended portion of the disk have never been written to and can therefore be assumed to be zeroed out.

Enabling/Disabling Change Tracking

In one embodiment, a virtual machine's capabilities field is extended to include a Boolean value that indicates whether or not change tracking can be enabled for a particular virtual machine. Clients can query this entry to determine whether change tracking can be turned on or not. In one aspect, the capabilities structure only indicates that change tracking is supported for a specific VM, not that it is actually enabled. In another aspect, a virtual machine's configuration field is extended to include a Boolean flag indicating whether change tracking is currently activated for this VM or not.

In one embodiment, in order to activate/deactivate change tracking for a virtual machine, a VM reconfiguration request can be sent to the host operating system or a kernel. In one aspect, toggling a VM's change tracking state only takes effect after the VM has gone through a stun/unstun cycle if the VM is currently powered on, e.g., as during a snapshot operation or a suspend/resume cycle.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that embodiments of the present invention as described above can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention have been presented for purposes of illustration and description. It is not intended to be exhaustive or to limit the invention to the precise form described, and many modifications and variations are possible in light of the teaching above. The embodiments were chosen and described to explain the principles of the invention and its practical applications to enable those skilled in the art to utilize the invention in various embodiments and with various modifications as are suited to the particular use contemplated.

Appendix A—Overview of Virtualization

A. General Virtualized Computer System

The advantages of virtual machine technology have become widely recognized. Among these advantages is an ability to run multiple virtual machines on a single host platform. This makes better use of the capacity of the hardware, while ensuring that each user enjoys the features of a "complete," isolated computer. Depending on how it is implemented, virtualization also provides greater security since it can isolate potentially unstable or unsafe software so that it cannot adversely affect the hardware state or system files.

Figure 1:
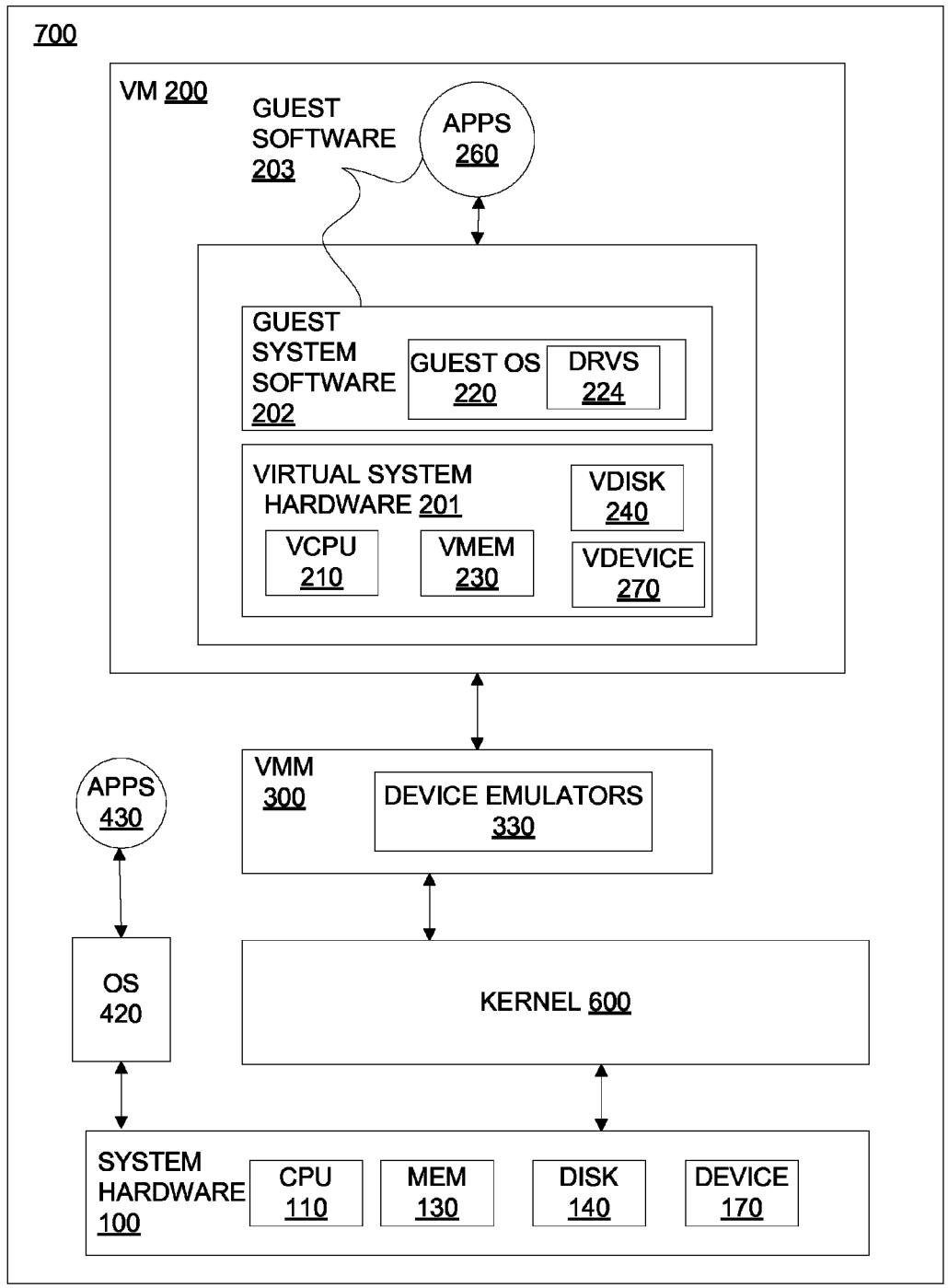
FIG. 1 illustrates a virtualized computer system according to embodiments of the present invention.

As is well known in the field of computer science, a virtual machine (VM) is a software abstraction, or "virtualization," of an actual physical computer system. FIG. 1 shows one possible arrangement of computer system 700 that implements virtualization. FIG. 1 shows virtual machine (VM) 200 and virtual machine monitor (VMM) 300 coupled to an exemplary system hardware platform 100. Optional kernel 600 (used in non-hosted systems) is also shown. System 700 may include additional VMs 200 and VMMs 300.

In FIG. 1, virtual machine (VM) 200, which in this system is a "guest," is installed on a "host platform," or simply "host," which includes system hardware 100 and one or more layers or co-resident components comprising system-level software, such as host operating system (OS) 420 or similar kernel 600, VMMs 300-300n, or some combination of these. As software, code defining VM 200 will ultimately execute on the actual system hardware 100.

As in almost all computers, system hardware 100 will typically include one or more CPUs 110, some form of memory 130 (volatile and/or non-volatile), one or more storage devices such as one or more disks 140, and one or more devices 170, which may be integral or separate and removable. Examples of devices 170 include a user's monitor and input devices such as a keyboard, mouse, trackball, touchpad, etc.

In many existing virtualized systems, hardware processor (s) 110 are the same as in a non-virtualized computer with the same platform, for example, the Intel x86 platform. Because of the advantages of virtualization, however, some hardware vendors have proposed, developed, or released processors that include specific hardware support for virtualization.

Each VM 200 will typically mimic the general structure of a physical computer and as such will usually have both virtual system hardware 201 and guest software 203, including guest system software 202 and guest applications 260. The virtual system hardware typically includes at least one virtual CPU 210, virtual memory 230, at least one storage device such as virtual disk 240, and one or more virtual devices 270. Note that virtual disk 240 and physical disk 140 are also "devices," but are shown separately in FIG. 1 because of the important roles they play. All of the virtual hardware components of VM 200 may be implemented in software to emulate corresponding physical components. Guest system software 202 typically includes guest operating system (OS) 220 and drivers 224 as needed, for example, for the various virtual devices 270. In particular, a driver VDSK may be included to manage access to virtual disk 240.

It is intended that applications 260 running on VM 200 will function as they would if run on a "real" computer. This occurs even though the applications are running at least partially indirectly, that is via guest OS 220 and virtual processor (s) (210a-210c). Executable files will be accessed by guest OS 220 from virtual disk 240 or virtual memory 230, which will be portions of the actual physical disk 140 or physical memory 130 allocated to VM 200. Applications may be installed within VM 200 in a conventional manner, using guest OS 220. Guest OS 220 retrieves files required for the execution of such installed applications from virtual disk 240 in a conventional manner.

Some interface is generally required between guest software 202 within VM 200 and the various hardware components and devices in the underlying hardware platform, e.g. transferring data to and from actual memory 130 and storage devices 140. This interface—which can be generally referred to as "virtualization software" or a "virtualization software layer"—may include one or more software components and/or layers, possibly including one or more of the software components known in the field of virtual machine technology as "virtual machine monitors" (VMMs) 300, "hypervisors," or virtualization "kernels" 600. The interface exported to VM 200 is then the same as the hardware interface of the machine (or at least of some machine), so that guest OS 202 cannot determine the presence of the VMM.

Because virtualization terminology has evolved over time and has not yet become fully standardized, these terms do not always provide clear distinctions between the software layers and components to which they refer. For example, "hypervisor" is often used to describe both VMM 300 and kernel 600 together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in host OS 420 itself. Unless otherwise indicated, one or more embodiments of the invention described herein may be used in virtualized computer systems having any type or configuration of virtualization software.

Moreover, FIG. 1 shows virtual machine monitors that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that one or more embodiments of the invention can be implemented anywhere within the overall structure of the virtualization software, and even in systems that provide specific hardware support for virtualization.

The various virtualized hardware components in the VM, such as the virtual CPU(s), virtual memory 230, virtual disk 240, and virtual device(s) 270, are shown as being part of VM 200 for the sake of conceptual simplicity. In actuality, these "components" are usually implemented as software emulations 330 included in VMM 300. One advantage of such an arrangement is that VMM 300 may (but need not) be set up to expose "generic" devices, which facilitate VM migration and hardware platform-independence.

Virtual machines can be configured as "fully virtualized," in which no software components are included in guest software 202 other than those that would be found in a non-virtualized computer. For example, guest OS 220 could be a commercial, off-the-shelf OS with no components designed specifically to support a virtualized environment.

"Para-virtualized" machines can include guest software 202 that is configured in some way to provide features that facilitate virtualization. For example, guest OS 220 that is designed to avoid certain privileged instructions and certain memory address ranges can be part of a para-virtualized machine. In another example of para-virtualization, a driver is loaded that is designed to communicate with other virtualization components.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms "host" OS 420 that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

At boot-up time, an existing operating system 420 (which may be of the same type as host OS 220 in the configuration of FIG. 1) may be at system level and kernel 600 may not yet even be operational within the system. In such case, one of the functions of OS 420 may be to make it possible to load kernel 600, after which the kernel runs on native hardware 100 and manages system resources. In effect, the kernel, once loaded, displaces OS 420. Thus, kernel 600 may be viewed either as displacing OS 420 from the system level and taking this place itself, or as residing at a "subsystem level." When interposed between OS 420 and hardware 100, kernel 600 essentially turns OS 420 into an "application," which has access to system resources only when allowed by kernel 600. The kernel then schedules OS 420 as if it were any other component that needs to use system resources.

As illustrated in FIG. 1, in many cases, it may be beneficial to deploy VMMs on top of a software layer—kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The ESX Server product of VMware, Inc. has such a configuration. A kernel-based virtualization system of the type illustrated in FIG. 2 is described in U.S. patent application Ser. No. 09/877,378 ("Computer Configuration for Resource Management in Systems Including a Virtual Machine"), which is also incorporated here by reference.

In some embodiments, kernel 600 can also handle any other applications running on it that can be separately scheduled, as well as console operating system 420 that, in some architectures, is used to boot the system and, facilitate certain user interactions with the virtualization software, for example, using applications 430. Note that kernel 600 is not the same as the kernel that will be within guest OS 220—as is well known; every operating system has its own kernel.

B. Virtual and Physical Memory

As in most modern computers, the address space of memory 130 is partitioned into pages (for example, in the Intel x86 architecture), regions (for example, Intel IA-64 architecture) or other analogous allocation units. Applications then address memory 130 using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address physical memory 130. The same offset is usually used in both a VA and its corresponding PA, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by application 260 in VM 200 is remapped twice to determine which page of the hardware memory is intended. The first mapping is provided by a mapping module within guest OS 202, which translates the guest VPN (GVPN) into a corresponding guest PPN (GPPN) in the conventional manner. The guest OS therefore "believes" that it is directly addressing the actual hardware memory, but in fact it is not.

Of course, a valid address to actual hardware memory 130 must ultimately be generated. A memory management module, located typically in VMM 300 or kernel 600, therefore performs the second mapping by taking the GPPN issued by guest OS 202 and mapping it to a hardware (or "machine") page number PPN that can be used to address hardware memory 130. This GPPN-to-PPN mapping may instead be done in the main system-level software layer (such as in a mapping module in a memory management unit in kernel 600), depending on the implementation. From the perspective of the guest OS, the GVPN and GPPN might be virtual and physical page numbers just as they would be if the guest OS 520 were the only OS in the system. From the perspective of the system software, however, the GPPN is a page number that is then mapped into the physical memory space of the hardware memory as a PPN.

The addressable space of disk(s) 140, and therefore also of the virtual disk(s) 240, is similarly subdivided into separately identifiable portions such as blocks or sectors, tracks, cylinders, etc. In general, applications do not directly address the disk; rather, disk access and organization are tasks reserved to the operating system, which follows some predefined file system structure. When guest OS 202 wants to write data to (virtual) disk 240, the identifier used for the intended block, etc., is therefore also converted into an identifier into the address space of physical disk 140. Conversion may be done within whatever system-level software layer that handles the VM, either VMM 300, host OS 420 (under direction of the VMM), or in kernel 600. Disk 140 may be a single physical disk or a plurality of physical disks, such as a RAID array.

We claim:

1. A method for tracking changes made to a virtual disk of a virtual machine running on a computer system, the method comprising:

receiving from a storage system a response acknowledging a completion of a write request to the virtual disk, wherein the write request was issued by the computer system on behalf of the virtual machine;

based on block information corresponding to the response, updating tracking information maintained by a virtualization software layer of the computer system, wherein the tracking information indicates whether each of a plurality of blocks of the virtual disk has been written to since a backup event that backed up at least a portion of the virtual disk;

upon an occurrence of each new backup event,
incrementing an event counter,
updating a log that maintains a corresponding event counter value for each block of the plurality of blocks, wherein the updating of the log comprises assigning the incremented event counter's value to the corresponding event counter value for each block that has been written to as indicated by the tracking information, and clearing the tracking information;

receiving a request relating to performing a specific backup event by a first backup routine, wherein the request includes a stored event counter value indicating when the first backup routine last performed a backup of the virtual disk; and providing, in response to the request, identities of the plurality of blocks having a corresponding event counter value in the log that is higher than the stored even counter value in the request, thereby enabling the first backup routine to copy the identified blocks when performing the specific backup event.

2. The method of claim 1, wherein the first backup routine is one of a plurality of backup routines having different backup time periods in backing up at least a portion of the virtual disk.

3. The method of claim 1, wherein the tracking information is stored in a memory of the virtualization software layer and the log is stored in the storage system.

4. The method of claim 1, wherein the tracking information is stored as a bitmap having one bit for each block.

5. The method of claim 1, wherein the tracking information is stored as a bloom filter.

6. The method of claim 1, wherein the incrementing, updating, and clearing operations are further performed upon occurrences of events relating to copying or moving the virtual disk.

7. The method of claim 1, further comprising:
creating a snapshot of the virtual disk having an independent copy of the tracking information based on the tracking information associated with the virtual disk; and
tracking changes to the snapshot using the independent copy of the tracking information.

8. The method of claim 7, further comprising:
when committing the snapshot to the virtual disk, replacing the tracking information associated with the virtual disk with the independent copy of the tracking information.

9. The method of claim 8, further comprising:
upon a determination that change-tracking is enabled for the snapshot, enabling change-tracking for the virtual disk.

10. The method of claim 1, wherein the log further includes an ID, the method further comprising:
recording the ID included in the log as a recorded ID each time the first backup routine is performed for the virtual disk; and
performing a backup of the plurality of blocks when the recorded ID is not equal to the ID included in the log.

11. The method of claim 10, wherein the log further includes a clean/dirty bit, the method further comprising:
upon opening the virtual disk, checking the state of the clean/dirty bit;
when the clean/dirty bit is dirty, initializing the tracking information and the log; and
creating a new ID and storing the new ID as the ID included in the log.

12. The method of claim 11, further comprising:
resizing the virtual disk to contain newly extended blocks; and
marking the clean/dirty bit as dirty when the newly extended blocks are written to.

13. The method of claim 1, further comprising:
maintaining a redundant virtual machine based on the virtual machine, wherein the redundant virtual machine has a redundant virtual disk synchronized with the virtual disk of the virtual machine; and
re-synchronizing the redundant virtual disk with the virtual disk based on the tracking information associated with the virtual disk.

14. The method of claim 1, further comprising:
using a second backup routine to perform multiple backups of the virtual disk since the last backup performed by the first backup routine, wherein each of the multiple backups using the second backup routine retrieves data for each of the plurality of blocks that have a corresponding event counter value higher than the stored event counter value for the last backup performed by the first backup routine.

15. The method of claim 1, further comprising porting the virtual machine to another computer system, wherein porting includes:
replicating data of the virtual disk to another storage system in a first copy session;
using the tracking information to track changes made to the virtual disk during the first copy session;
copying blocks that have been written to during the first copy session to the another storage system in a second copy session, wherein the blocks that have been written to during the first copy session are identified based on the tracking information; and
preventing the virtual disk from being written to during the second copy session.

16. A computer program product comprising a computer readable medium encoded with a plurality of instructions for controlling a processor to perform an operation for tracking changes made to a virtual disk of a virtual machine running on a computer system, the instructions comprising:
receiving from a storage system a response acknowledging a completion of a write request to the virtual disk, wherein the write request was issued by the computer system on behalf of the virtual machine;
based on block information corresponding to the response, updating tracking information maintained by a virtualization software layer of the computer system, wherein the tracking information indicates whether each of a plurality of blocks has been written to since a backup event that backed up at least a portion of the virtual disk;
upon an occurrence of each new backup event,
incrementing an event counter,
updating a log that maintains a corresponding event counter value for each block of the plurality of blocks, wherein the updating of the log comprises assigning the incremented event counter's value to the corresponding event counter value for each block that has been written to as indicated by the tracking information, and
clearing the tracking information;
receiving a request relating to performing a specific backup event by a backup routine, wherein the request includes a stored event counter value indicating when the backup routine last performed a backup of the virtual disk; and
providing, in response to the request, identities of the plurality of blocks having a corresponding event counter value in the log that is higher than the stored even counter value in the request, thereby enabling the backup routine to copy the identified blocks when performing the specific backup event.

17. A method of backing up data on a storage device, the method comprising:
incrementing a counter each time a backup of blocks of a storage device is performed;

tracking a first value of the counter when a first backup routine performs a backup of the storage device;

tracking a second value of the counter when a second backup routine performs a backup of the storage device;

for each block in the blocks, storing the counter's value as a corresponding counter value when data for each block was last changed; and performing a backup with the first backup routine by retrieving the data for each of the blocks that have a corresponding counter value higher than the first value for the last backup performed by the first backup routine.

18. The method of claim 17, wherein the storage device is a virtual disk.

19. The method of claim 17, further comprising:

tracking which blocks are changed after incrementing the value of the counter; and updating the counter value stored for each block by storing the current counter value for each block changed.

20. The method of claim 19, information as to which blocks are changed after incrementing the value of the counter is stored as a bitmap having one bit for each block.

21. The method of claim 20, further comprising:
resetting the bitmap when a backup is performed.

22. The method of claim 17, further comprising:
storing a clean/dirty bit for the storage device;

upon opening the storage device, checking the state of the clean/dirty bit;

when the clean/dirty bit is dirty, resetting the corresponding counter values for each of the blocks; and creating and storing a new ID associated with the storage device.

23. The method of claim 22, further comprising:

tracking the value of the ID when either the first backup routine or the second backup routine performs a backup of the storage device;

when the tracked ID is not equal to the stored new ID, performing a backup by retrieving the data for all of the blocks of the storage device.

* * * * *